US012018231B2

(12) United States Patent
Nad et al.

(10) Patent No.: US 12,018,231 B2
(45) Date of Patent: Jun. 25, 2024

(54) SOAP BAR COMPOSITION FOR HIGH WATER STRUCTURING AND BINDING

(71) Applicants: Dow Global Technologies LLC, Midland, MI (US); Dow Silicones Corporation, Midland, MI (US)

(72) Inventors: Saugata Nad, Brussels (BE); Padmadas Nair, Maharashtra (IN); Deepak Dandekar, Maharashtra (IN); Sangeeta Sanjeev Patel, Mumbai (IN); Amit Kumar Verma, Uttar Pradesh (IN)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/015,596

(22) PCT Filed: Aug. 20, 2021

(86) PCT No.: PCT/US2021/046809

§ 371 (c)(1),
(2) Date: Jan. 11, 2023

(87) PCT Pub. No.: WO2022/040489

PCT Pub. Date: Feb. 24, 2022

(65) Prior Publication Data

US 2023/0250370 A1 Aug. 10, 2023

(30) Foreign Application Priority Data

Aug. 21, 2020 (IN) ............................ 202041036066

(51) Int. Cl.

| | |
|---|---|
| ***C11D 17/00*** | (2006.01) |
| ***C11D 9/08*** | (2006.01) |
| ***C11D 9/26*** | (2006.01) |
| ***C11D 9/38*** | (2006.01) |
| ***C11D 9/44*** | (2006.01) |

(52) U.S. Cl.

CPC ............ *C11D 17/0069* (2013.01); *C11D 9/08* (2013.01); *C11D 9/262* (2013.01); *C11D 9/38* (2013.01); *C11D 9/442* (2013.01); *C11D 9/444* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 4,732,693 | A | 3/1988 | Hight | |
| 5,703,026 | A | 12/1997 | Setser et al. | |
| 8,618,035 | B2 | 12/2013 | Lai et al. | |
| 9,750,667 | B2 | 9/2017 | Misner et al. | |
| 2007/0021314 | A1 | 1/2007 | Salvador et al. | |
| 2007/0196313 | A1 | 8/2007 | Scala et al. | |
| 2020/0347324 | A1* | 11/2020 | Wieland | C11D 3/381 |

FOREIGN PATENT DOCUMENTS

| | | |
|---|---|---|
| EP | 2319909 | 5/2011 |
| WO | 1998018896 | 5/1998 |
| WO | 1999014307 | 3/1999 |
| WO | 2002046346 | 6/2002 |

* cited by examiner

*Primary Examiner* — Necholus Ogden, Jr.

(74) *Attorney, Agent, or Firm* — Thomas S. Deibert

(57) ABSTRACT

A soap bar is provided, comprising: a soap; water; a cellulose derivative selected from the group consisting of a hydroxyalkyl alkyl cellulose; and an additive selected from the group consisting of a psyllium, a sodium silicate and mixtures thereof; wherein the soap bar is a solid.

9 Claims, No Drawings

SOAP BAR COMPOSITION FOR HIGH WATER STRUCTURING AND BINDING

The present invention relates to a soap bar. In particular, the present invention relates to a soap bar, comprising: a soap; water; a cellulose derivative selected from the group consisting of a hydroxyalkyl alkyl cellulose; and an additive selected from the group consisting of a psyllium, a sodium silicate and mixtures thereof; wherein the soap bar is a solid.

Bar soaps remain popular with consumers for cleansing laundry, hard surfaces and skin.

Finishing milled soap bars are conventionally prepared from soap noodles having a total fatty matter (TFM) content of more than 70 wt %, 10-14 wt % water and other components (e.g., titanium dioxide, surfactant and fragrance). Currently milled bars have a typical water content of about 8 to 15 wt % and had non-milled bars have a water content of 20 to 25 wt %.

Bar soaps of varying compositions are known. Conventional bar soaps are formulated with a variety of additives to impart benefits that are inherent to the soap. Conventional bar soaps contain at least one soap (i.e., a monovalent sodium, potassium, ammonium and alkanol ammonium salts of monocarboxylic fatty acids) and optionally one or more adjuvants such as moisturizers, humectants, antibacterial agents, water, fillers, polymers, processing aids, dyes, fragrances, etc., to enhance the cleaning and conditioning properties of the bar soap.

It is desirable to create bar soap compositions having high water content to facilitate formulation and process efficiency. Notwithstanding, it has been difficult to maintain the high water content of the formulation following processing to form the finished bar soap.

Thus, there remains a for new soap bar formulations enabling high water content in the finished bar soap while retaining other desirable soap bar properties such as wear rate.

The present invention provides a soap bar, comprising: 35 to <74.99 wt %, based on weight of the soap bar, of a soap; >23 to 40 wt %, based on weight of the soap bar, of water; 0.01 to 5 wt %, based on weight of the soap bar, of a cellulose derivative selected from the group consisting of a hydroxyalkyl alkyl cellulose; and an additive selected from the group consisting of (a) 0.1 to 5 wt %, based on weight of the soap bar, of a psyllium; (b) 2 to 18 wt %, based on weight of the soap bar, of a sodium silicate; and (c) mixtures thereof; wherein the soap bar is a solid.

The present invention provides a soap bar, comprising: 35 to <74.89 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; and 2 to 18 wt %, based on weight of the soap bar, of a sodium silicate; wherein the soap bar is a solid.

The present invention provides a soap bar, comprising: 35 to <74.89 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; wherein the cellulose derivative is selected from the group consisting of a hydroxyethyl methyl cellulose, a hydroxypropyl methyl celluose, hydroxyethyl cellulose and a mixture thereof; and 2 to 18 wt %, based on weight of the soap bar, of a sodium silicate; wherein the soap bar is a solid.

The present invention provides a soap bar, comprising: 35 to <74.88 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; wherein the cellulose derivative is a hydroxyethyl methyl cellulose; 2 to 18 wt %, based on weight of the soap bar, of a sodium silicate; and 0.01 to 3 wt %, based on weight of the soap bar, of a processing aid; wherein the soap bar is a solid.

The present invention provides a soap bar, comprising: 35 to <74.87 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; wherein the cellulose derivative is a hydroxyethyl methyl cellulose; 2 to 18 wt %, based on weight of the soap bar, of a sodium silicate; 0.01 to 3 wt %, based on weight of the soap bar, of a processing aid; and 0.01 to 3 wt %, based on weight of the soap bar, of an optional component selected from the group consisting of at least one of a fragrance and a dye; wherein the soap bar is a solid.

The present invention provides a soap bar, comprising: 35 to <74.87 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; wherein the cellulose derivative is a hydroxyethyl methyl cellulose; 2 to 18 wt %, based on weight of the soap bar, of a sodium silicate; 0.01 to 3 wt %, based on weight of the soap bar, of a processing aid; 0.01 to 3 wt %, based on weight of the soap bar, of an optional component selected from the group consisting of at least one of a fragrance and a dye; and a filler; wherein the soap bar is a solid and wherein the soap bar is a laundry soap bar.

The present invention provides a soap bar, comprising: 35 to <74.77 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; wherein the cellulose derivative is a hydroxyethyl methyl cellulose; 2 to 18 wt %, based on weight of the soap bar, of a sodium silicate; 0.01 to 3 wt %, based on weight of the soap bar, of a processing aid; 0.01 to 3 wt %, based on weight of the soap bar, of an optional component selected from the group consisting of at least one of a fragrance and a dye; and 0.1 to 5 wt %, based on weight of the soap bar, of a humectant; wherein the soap bar is a solid and wherein the soap bar is a personal cleansing soap bar.

The present invention provides a soap bar, comprising: 50 to <74.76 wt %, based on weight of the soap bar, of a soap; >23 to 40 wt %, based on weight of the soap bar, of water; 0.1 to 5 wt %, based on weight of the soap bar, of a psyllium; 0.01 to 5 wt %, based on weight of the soap bar, of a cellulose derivative selected from the group consisting of a hydroxyalkyl alkyl cellulose; wherein the cellulose derivative is a hydroxyethyl methyl cellulose; 2 to 18 wt %, based on weight of the soap bar, of a sodium silicate; 0.01 to 3 wt %, based on weight of the soap bar, of a processing aid; 0.01 to 3 wt %, based on weight of the soap bar, of an optional component selected from the group consisting of at least one of a fragrance and a dye; 0.1 to 5 wt %, based on weight of the soap bar, of a humectant; 0.01 to 0.5 wt %, based on weight of the soap bar, of a chelating agent; wherein the soap bar is a solid and wherein the soap bar is a personal cleansing soap bar.

The present invention provides a method of making a soap bar, comprising: providing a soap; providing a psyllium; providing a cellulose derivative selected from the group consisting of a hydroxyalkyl alkyl cellulose; providing a sodium silicate; providing water; mixing the soap, the psyllium, the hydroxyalkyl alkyl cellulose, the sodium silicate and the water to form a combination; milling the combination; extruding the milled combination; and stamping the extruded material to provide the soap bar.

The present invention provides a method of making a soap bar, comprising: providing a soap; providing a psyllium; providing a cellulose derivative selected from the group consisting of a hydroxyalkyl alkyl cellulose; providing a sodium silicate; providing water; providing a filler; providing a fragrance; and providing a processing aid; mixing the soap, the psyllium, the hydroxyalkyl alkyl cellulose, the sodium silicate, the filler, the fragrance, the titanium dioxide and the water to form a combination; milling the combination; extruding the milled combination; and stamping the extruded material to provide the soap bar.

DETAILED DESCRIPTION

We have surprisingly found that soap bars containing a synergistic combination of a cellulose derivative selected from the group consisting of hydroxyalkyl alkyl cellulose with at least one of a psyllium and a sodium silicate facilitates high water content (>23 wt %) in the finished soap bar while exhibiting enhanced wear resistance (preferably, wherein the finished soap bar exhibits long term water retention and wherein the finished soap bar resists cracking from water loss for up to one year).

Unless otherwise indicated, ratios, percentages, parts, and the like are by weight.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polyethylene glycol standards. GPC techniques are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

Preferably, the soap bar of the present invention, comprises: 35 to <74.99 wt % (preferably, 40 to 70 wt %; more preferably, 45 to 68 wt %; most preferably, 50 to 65 wt %), based on weight of the soap bar, of a soap; >23 to 40 wt % (preferably, 25.5 to 40 wt %; more preferably, 25.75 to 37.5; most preferably, 26 to 32 wt %), based on weight of the soap bar, of water; 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; and an additive selected from the group consisting of (a) 0.1 to 5 wt % (preferably, 0.2 to 4 wt %; more preferably, 0.25 to 3.5 wt %; most preferably, 0.4 to 3.2 wt %), based on weight of the soap bar, of a psyllium; (b) 2 to 18 wt % (preferably, 2.25 to 10 wt %; more preferably, 2.5 to 7.5 wt %; most preferably, 3 to 5 wt %), based on weight of the soap bar, of a sodium silicate; and (c) mixtures thereof; wherein the soap bar is a solid (i.e., wherein the soap bar does not perceptibly change shape when placed on a rigid surface and left to stand at room temperature, 22° C., and pressure, 101.4 kPa, for 24 hours).

Preferably, the soap bar of the present invention, comprises: 35 to <74.89 wt % (preferably, 40 to 70 wt %; more preferably, 45 to 68 wt %; most preferably, 50 to 65 wt %), based on weight of the soap bar, of a soap; >23 to 40 wt % (preferably, 25.5 to 40 wt %; more preferably, 25.75 to 37.5; most preferably, 26 to 32 wt %), based on weight of the soap bar, of water; 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; 0.1 to 5 wt % (preferably, 0.2 to 4 wt %; more preferably, 0.25 to 3.5 wt %; most preferably, 0.4 to 3.2 wt %), based on weight of the soap bar, of a psyllium; 2 to 18 wt % (preferably, 2.25 to 10 wt %; more preferably, 2.5 to 7.5 wt %; most preferably, 3 to 5 wt %), based on weight of the soap bar, of a sodium silicate; wherein the soap bar is a solid (i.e., wherein the soap bar does not perceptibly change shape when placed on a rigid surface and left to stand at room temperature, 22° C., and pressure, 101.4 kPa, for 24 hours).

Preferably, the soap bar of the present invention, comprises: 35 to <74.99 wt % (preferably, 40 to 70 wt %; more preferably, 45 to 68 wt %; most preferably, 50 to 65 wt %), based on weight of the soap bar, of a soap. More preferably, the soap bar of the present invention, comprises: 35 to <74.99 wt % (preferably, 40 to 70 wt %; more preferably, 45 to 68 wt %; most preferably, 50 to 65 wt %), based on weight of the soap bar, of a soap, wherein the soap is selected from the group consisting of monovalent salts of monocarboxylic fatty acids having counterions selected from the group consisting of sodium, potassium, ammonium and alkanol ammonium ions. Still more preferably, the soap bar of the present invention, comprises: 35 to <74.99 wt % (preferably, 40 to 70 wt %; more preferably, 45 to 68 wt %; most preferably, 50 to 65 wt %), based on weight of the soap bar, of a soap; wherein the soap is an alkali (preferably, sodium) salt of a fatty acid from at least one of an animal fat and a vegetable oil. Yet more preferably, the soap bar composition of the present invention, comprises: 35 to <74.99 wt % (preferably, 40 to 70 wt %; more preferably, 45 to 68 wt %; most preferably, 50 to 65 wt %), based on weight of the soap bar, of a soap; wherein the soap is an alkali (preferably, sodium) salt of a fatty acid from at least one of palm oil, palm kernel oil, castor oil, rice bran oil, sunflower oil, coconut oil, soybean oil, peanut oil, tallow, lard, fish oil and blends thereof. Yet still more preferably, the soap bar of the present invention, comprises: 35 to <74.99 wt % (preferably, 40 to 70 wt %; more preferably, 45 to 68 wt %; most preferably, 50 to 65 wt %), based on weight of the soap bar, of a soap; wherein the soap is an alkali (preferably, sodium) salt of a fatty acid from a 40:60 to 97:3 blend of oils and fats (preferably, the blend of oils and fats is selected from a blend of palm and palm kernel oils and a blend of palm and coconut kernel oils). Most preferably, the soap bar of the present invention, comprises: 35 to <74.99 wt % (preferably, 40 to 70 wt %; more preferably, 45 to 68 wt %; most preferably, 50 to 65 wt %), based on weight of the soap bar, of a soap; wherein the soap is an alkali (preferably, sodium)

salt of a fatty acid from an 50:50, 60:40, 70:30, 80:20 or 90:10 (preferably, an 80:20) blend of palm oil and palm kernel oil.

Preferably, the soap bar of the present invention, comprises: >23 to 40 wt % (preferably, 25.5 to 40 wt %; more preferably, 25.75 to 37.5; most preferably, 26 to 32 wt %), based on weight of the soap bar, of water. More preferably, the soap bar of the present invention, comprises: >23 to 40 wt % (preferably, 25.5 to 40 wt %; more preferably, 25.75 to 37.5; most preferably, 26 to 32 wt %), based on weight of the soap bar, of water; wherein the water is at least one of distilled and deionized water. Most preferably, the soap bar of the present invention, comprises: >23 to 40 wt % (preferably, 25.5 to 40 wt %; more preferably, 25.75 to 37.5; most preferably, 26 to 32 wt %), based on weight of the soap bar, of water; wherein the water is deionized water.

Preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose, hydroxyalkyl cellulose and mixtures thereof. More preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose is selected from the group consisting of hydroxy-$(C_{1-4})$alkyl $C_{1-4}$ alkyl cellulose. Still more preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose is selected from the group consisting of hydroxyethyl methyl cellulose, hydroxypropyl methyl cellulose and mixtures thereof. Most preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose is hydroxyethyl methyl cellulose.

Preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose has a weight average molecular weight, Mw, of 25,000 to 4,000,000 Daltons (preferably, 25,000 to 1,500,000 Daltons; more preferably, 25,000 to 500,000 Daltons; most preferably, 25,000 to 150,000 Daltons). More preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose has a weight average molecular weight, Mw, of 25,000 to 4,000,000 Daltons (preferably, 25,000 to 1,500,000 Daltons; more preferably, 25,000 to 500,000 Daltons; most preferably, 25,000 to 150,000 Daltons); and wherein the hydroxyalkyl alkyl cellulose is selected from hydroxyethyl methyl cellulose, hydroxypropyl methyl cellulose and mixtures thereof. Most preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose has a weight average molecular weight, Mw, of 25,000 to 4,000,000 Daltons (preferably, 25,000 to 1,500,000 Daltons; more preferably, 25,000 to 500,000 Daltons; most preferably, 25,000 to 150,000 Daltons); and wherein the hydroxyalkyl alkyl cellulose is hydroxyethyl methyl cellulose.

Preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose is a cellulose ether having alkyl and hydroxyalkyl derivatives in which the average number of substituent groups per anhydroglucose unit is from 1 to 3 (preferably, 1.5 to 3; more preferably, 2 to 3). Preferably, the hydroxyalkyl groups have 1 to 4 carbon atoms (preferably, 1 to 3 carbon atoms; more preferably, 2 to 3 carbon atoms; most preferably, 2 carbon atoms). Preferably, the alkyl groups have 1 to 4 carbon atoms (preferably, 1 to 3 carbon atoms; more preferably, 1 to 2 carbon atoms; most preferably, 1 carbon atom).

Preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose has a substantially linear cellulose backbone. The term "substantially linear" as used herein and in the appended claims means that 97 to 100 wt % (preferably, 99 to 100 wt %) of all glucose units in the hydroxyalkyl alkyl cellulose are in a main chain of the cellulose backbone.

Preferably, the soap bar of the present invention, comprises: 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose; wherein the hydroxyalkyl alkyl cellulose has a substantially β-1,4 linked backbone. The term "substantially β-1,4 linked backbone" as used herein and in the appended claims means that 97 to 100 wt % (preferably, 99 to 100 wt %) of the glucose units in the hydroxyalkyl alkyl cellulose are bounded together with β-1,4 linkages. When less than 100 wt % of the glucose units are bounded together with β-1,4 linkages, the remaining glucose units may be bounded in a variety of ways, including, for example, β-1,2; β-1,3; β-1,6; β-2,3; α-1,2; α-1,3; α-1,4; α-1,6 and α-2,3 linkages and mixtures thereof.

Preferably, the soap bar of the present invention, comprises: 0.1 to 5 wt % (preferably, 0.2 to 4 wt %; more preferably, 0.25 to 3.5 wt %; most preferably, 0.4 to 3.2 wt %), based on weight of the soap bar, of a psyllium. Psyllium is commercially available as particles or in powder form. Psyllium is branched, mainly consisting of a neutral arabinoxylan with (1→4) and (1→3) xylopyranose backbones; wherein the side chains are composed of arabinose and xylose, which are connected to the main chain by O-3 and/or O-2 linkages. Psyllium can be extracted from the seed coat (husk or hull) of *ispaghula* or psyllium seeds of the *Plantago* genus. Psyllium is composed mainly of arabinose (22 wt %), xylose (57 wt %) and uronic acids (10-15 wt %) with small amounts of galactose, rhamnose, glucose and mannose.

Psyllium is a highly branched acidic arabinoxylan with a high molecular weight (~1,500,000 Daltons).

Preferably, the soap bar of the present invention, comprises: 2 to 18 wt % (preferably, 2.25 to 10 wt %; more preferably, 2.5 to 7.5 wt %; most preferably, 3 to 5 wt %), based on weight of the soap bar, of a sodium silicate.

Preferably, the soap bar of the present invention, comprises a blend of the psyllium and the cellulose derivative at a weight ration of 1:9 to 9:1 (preferably, 1:5 to 5:1; more preferably, 1:4 to 4:1).

Preferably, the soap bar of the present invention, is a solid. The term "solid" as used herein and in the appended claims in reference to a soap bar means that the soap bar will not perceptible change shape when placed on a rigid surface and left to stand on the rigid surface at room temperature (22° C.) and pressure (101.4 kPa) for 24 hours.

Preferably, the soap bar of the present invention has a wear rate of 0.5 to 9 wt % (more preferably, 1 to 8 wt %), wherein the wear rate is the loss in weight of the soap bar after 4 days of use as described in the Examples.

Preferably, the soap bar of the present invention, further comprises an optional ingredient. More preferably, the soap bar of the present invention, further comprises an optional ingredient; wherein the optional ingredient is selected from the group consisting of humectants; processing aids (e.g., titanium dioxide); preservatives (e.g., benzoic acid, sorbic acid, phenoxyethanol); antioxidants (e.g., butylated hydroxytoluene); viscosity modifiers; polymers; free fatty acids; foam stabilizers; foam enhancers; fillers; chelating agents; antimicrobial agents (e.g., biocides); pH adjusting agents; pH buffering agents; fragrances/perfumes; salts; colorants (e.g., dyes) and mixtures thereof. Most preferably, the soap bar of the present invention, further comprises an optional ingredient selected from the group consisting of a processing aid (e.g., titanium dioxide), a fragrance, a colorant and mixtures thereof.

Preferably, the soap bar of the present invention, further comprises a humectant. More preferably, the soap bar of the present invention, further comprises 0.1 to 5 wt % (preferably, 0.25 to 2 wt %; more preferably, 0.5 to 1.5 wt %; most preferably, 0.75 to 1.25 wt %), based on weight of the soap bar, of a humectant. Still more preferably, the soap bar of the present invention, further comprises 0.1 to 5 wt % (preferably, 0.25 to 2 wt %; more preferably, 0.5 to 1.5 wt %; most preferably, 0.75 to 1.25 wt %), based on weight of the soap bar, of a humectant; wherein the humectant is a polyhydric alcohol selected from the group consisting of glycerin, sorbitol, propylene glycol, butylene glycol, hexylene glycol, ethoxylated glucose, 1,2-hexane diol, hexanetriol, dipropylene glycol, erythritol, trehalose, diglycerin, xylitol, maltitol, maltose, glucose, fructose and mixtures thereof. Yet more preferably, the soap bar of the present invention, further comprises 0.1 to 5 wt % (preferably, 0.25 to 2 wt %; more preferably, 0.5 to 1.5 wt %; most preferably, 0.75 to 1.25 wt %), based on weight of the soap bar, of a humectant; wherein the humectant includes glycerin. Most preferably, the soap bar of the present invention, further comprises 0.1 to 5 wt % (preferably, 0.25 to 2 wt %; more preferably, 0.5 to 1.5 wt %; most preferably, 0.75 to 1.25 wt %), based on weight of the soap bar, of a humectant; wherein the humectant is glycerin.

Preferably, the soap bar of the present invention, further comprises a processing aid. More preferably, the soap bar of the present invention, further comprises 0.05 to 2 wt % (preferably, 0.1 to 1.5 wt %; more preferably, 0.25 to 1.25 wt %; most preferably, 0.5 to 1 wt %), based on weight of the soap bar, of a processing aid. Still more preferably, the soap bar of the present invention, further comprises: 0.05 to 2 wt % (preferably, 0.1 to 1.5 wt %; more preferably, 0.25 to 1.25 wt %; most preferably, 0.5 to 1 wt %), based on weight of the soap bar, of a processing aid; wherein the processing aid is an inorganic powdery material selected from the group consisting of talc, calcite, kaolin, silicon dioxide, titanium dioxide, diatomaceous earth and mixtures thereof. Yet more preferably, the soap bar of the present invention, further comprises: 0.05 to 2 wt % (preferably, 0.1 to 1.5 wt %; more preferably, 0.25 to 1.25 wt %; most preferably, 0.5 to 1 wt %), based on weight of the soap bar, of a processing aid; wherein the processing aid is selected from the group consisting of talc, calcite, titanium dioxide and mixtures thereof. Most preferably, the soap bar of the present invention, further comprises: 0.05 to 2 wt % (preferably, 0.1 to 1.5 wt %; more preferably, 0.25 to 1.25 wt %; most preferably, 0.5 to 1 wt %), based on weight of the soap bar, of a processing aid; wherein the processing aid includes titanium dioxide.

Preferably, the soap bar of the present invention, further comprises a chelating agent. More preferably, the soap bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the soap bar, of a chelating agent. Still more preferably, the soap bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the soap bar, of a chelating agent; wherein the chelating agent is selected from the group consisting of diethylenetriamine pentaacetic acid; 1-hydroxyethane 1,1-diphosphonic acid; citric acid; ethylene diamine tetraacetic acid (EDTA), salts thereof and mixtures thereof. Yet more preferably, the soap bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the soap bar, of a chelating agent; wherein the chelating agent is selected from the group consisting of diethylenetriamine pentaacetic acid pentasodium salt, 1-hydroxyethane 1,1-diphosphonic acid disodium salt; citric acid, ethylene diamine tetraacetic acid (EDTA), ethylene diamine tetraacetic acid tetrasodium salt and mixtures thereof. Most preferably, the soap bar of the present invention, further comprises: 0.01 to 0.5 wt % (preferably, 0.05 to 0.3 wt %; more preferably, 0.075 to 0.25 wt %; most preferably, 0.1 to 0.2 wt %), based on weight of the soap bar, of a chelating agent; wherein the chelating agent includes ethylene diamine tetraacetic acid tetrasodium salt.

Preferably, the soap bar of the present invention, further comprises a fragrance. More preferably, the soap bar of the present invention, further comprises 0.01 to 3 wt % (preferably, 0.1 to 2 wt %; more preferably, 0.5 to 1.75 wt %; most preferably, 0.75 to 1.25 wt %), based on weight of the soap bar, of a fragrance.

Preferably, the soap bar of the present invention, further comprises a colorant. More preferably, the soap bar of the present invention, further comprises: 0.01 to 3 wt % (preferably, 0.1 to 2 wt %; more preferably, 0.5 to 1.75 wt %; most preferably, 0.75 to 1.25 wt %), based on weight of the soap bar, of a colorant.

Preferably, the soap bar of the present invention, comprises: 35 to <74.89 wt % (preferably, 40 to 70 wt %; more preferably, 45 to 68 wt %; most preferably, 50 to 65 wt %), based on weight of the soap bar, of a soap; >23 to 40 wt % (preferably, 25.5 to 40 wt %; more preferably, 25.75 to 37.5; most preferably, 26 to 32 wt %), based on weight of the soap bar, of water; 0.1 to 5 wt % (preferably, 0.2 to 4 wt %; more preferably, 0.25 to 3.5 wt %; most preferably, 0.4 to 3.2 wt %), based on weight of the soap bar, of a psyllium; 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose, wherein the cellulose derivative is hydroxyethyl methyl cellulose; 2 to 18 wt % (preferably, 2.25 to 10 wt %; more preferably, 2.5 to 7.5 wt %; most preferably, 3 to 5 wt %), based on weight of the soap bar, of a sodium silicate; optionally, a processing aid (preferably, 0.01 to 3 wt % (more preferably, 0.1 to 2 wt %; still more preferably, 0.25 to 1.5 wt %; most preferably, 0.5 to 1.0 wt %) (0.75 wt %), based on weight of the soap bar, of the processing aid (preferably, titanium dioxide)); optionally, an optional component selected from at least one of a fragrance and a colorant (preferably, 0.01 to 3 wt % (more preferably, 0.1 to 2 wt %; still more preferably, 0.25 to 1.5 wt %; most preferably, 0.5 to 1.0 wt %), based on weight of the soap bar, of the optional component selected from at least one of a fragrance and a colorant); wherein the soap bar is a solid and wherein the soap bar is a laundry soap bar. More preferably, the soap bar of the present invention, comprises: 35 to <74.89 wt % (preferably, 40 to 70 wt %; more preferably, 45 to 68 wt %; most preferably, 50 to 65 wt %), based on weight of the soap bar, of a soap; >23 to 40 wt % (preferably, 25.5 to 40 wt %; more preferably, 25.75 to 37.5; most preferably, 26 to 32 wt %), based on weight of the soap bar, of water; 0.1 to 5 wt % (preferably, 0.2 to 4 wt %; more preferably, 0.25 to 3.5 wt %; most preferably, 0.4 to 3.2 wt %), based on weight of the soap bar, of a psyllium; 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose, wherein the cellulose derivative is hydroxyethyl methyl cellulose; 2 to 18 wt % (preferably, 2.25 to 10 wt %; more preferably, 2.5 to 7.5 wt %; most preferably, 3 to 5 wt %), based on weight of the soap bar, of a sodium silicate; 0.01 to 3 wt % (preferably, 0.1 to 2 wt %; more preferably, 0.25 to 1.5 wt %; most preferably, 0.5 to 1.0 wt %), based on weight of the soap bar, of a processing aid (preferably, titanium dioxide); 0.01 to 3 wt % (preferably, 0.1 to 2 wt %; more preferably, 0.25 to 1.5 wt %; most preferably, 0.5 to 1.0 wt %), based on weight of the soap bar, of an optional component selected from at least one of a fragrance and a colorant; wherein the soap bar is a solid and wherein the soap bar is a laundry soap bar.

Preferably, the soap bar of the present invention, comprises: 35 to <74.89 wt % (preferably, 40 to 70 wt %; more preferably, 45 to 68 wt %; most preferably, 50 to 65 wt %), based on weight of the soap bar, of a soap; >23 to 40 wt % (preferably, 25.5 to 40 wt %; more preferably, 25.75 to 37.5; most preferably, 26 to 32 wt %), based on weight of the soap bar, of water; 0.1 to 5 wt % (preferably, 0.2 to 4 wt %; more preferably, 0.25 to 3.5 wt %; most preferably, 0.4 to 3.2 wt %), based on weight of the soap bar, of a psyllium; 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose, wherein the cellulose derivative is hydroxyethyl methyl cellulose; 2 to 18 wt % (preferably, 2.25 to 10 wt %; more preferably, 2.5 to 7.5 wt %; most preferably, 3 to 5 wt %), based on weight of the soap bar, of a sodium silicate; optionally, a processing aid (preferably, 0.01 to 3 wt % (more preferably, 0.1 to 2 wt %; still more preferably, 0.25 to 1.5 wt %; most preferably, 0.5 to 1.0 wt %), based on weight of the soap bar, of the processing aid (preferably, titanium dioxide)); optionally, an optional component selected from at least one of a fragrance and a colorant (preferably, 0.01 to 3 wt % (more preferably, 0.1 to 2 wt %; still more preferably, 0.25 to 1.5 wt %; most preferably, 0.5 to 1.0 wt %), based on weight of the soap bar, of the optional component selected from at least one of a fragrance and a colorant; optionally, a humectant (preferably, 0.1 to 5 wt % (more preferably, 0.25 to 2 wt %; still more preferably, 0.5 to 1.5 wt %; most preferably, 0.75 to 1.25 wt %), based on weight of the soap bar, of the humectant); and optionally, a chelating agent (preferably, 0.01 to 0.5 wt % (more preferably, 0.05 to 0.3 wt %; still more preferably, 0.075 to 0.25 wt %; most preferably, 0.1 to 0.2 wt %), based on weight of the soap bar, of the chelating agent); wherein the soap bar is a solid and wherein the soap bar is a personal cleansing soap bar. More preferably, the soap bar of the present invention, comprises: 35 to <74.89 wt % (preferably, 40 to 70 wt %; more preferably, 45 to 68 wt %; most preferably, 50 to 65 wt %), based on weight of the soap bar, of a soap; >23 to 40 wt % (preferably, 25.5 to 40 wt %; more preferably, 25.75 to 37.5; most preferably, 26 to 32 wt %), based on weight of the soap bar, of water; 0.1 to 5 wt % (preferably, 0.2 to 4 wt %; more preferably, 0.25 to 3.5 wt %; most preferably, 0.4 to 3.2 wt %), based on weight of the soap bar, of a psyllium; 0.01 to 5 wt % (preferably, 0.1 to 4.75 wt %; more preferably, 0.25 to 4.5 wt %; most preferably, 0.3 to 4 wt %), based on weight of the soap bar, of a cellulose derivative selected from the group consisting of a hydroxyalkyl alkyl cellulose, wherein the cellulose derivative is hydroxyethyl methyl cellulose; 2 to 18 wt % (preferably, 2.25 to 10 wt %; more preferably, 2.5 to 7.5 wt %; most preferably, 3 to 5 wt %), based on weight of the soap bar, of a sodium silicate; 0.01 to 3 wt % (preferably, 0.1 to 2 wt %; more preferably, 0.25 to 1.5 wt %; most preferably, 0.5 to 1.0 wt %), based on weight of the soap bar, of a processing aid (preferably, titanium dioxide)); 0.01 to 3 wt % (preferably, 0.1 to 2 wt %; more preferably, 0.25 to 1.5 wt %; most preferably, 0.5 to 1.0 wt %), based on weight of the soap bar, of the optional component selected from at least one of a fragrance and a colorant; 0.1 to 5 wt % (preferably, 0.25 to 2 wt %; more preferably, 0.5 to 1.5 wt %; most preferably, 0.75 to 1.25 wt %), based on weight of the soap bar, of a humectant; and 0.01 to 0.5 wt % (preferably, 0.05 to 0.3 wt %; more preferably, 0.075 to 0.25 wt %; most preferably, 0.1 to 0.2 wt %), based on weight of the soap bar, of the chelating agent; wherein the soap bar is a solid and wherein the soap bar is a personal cleansing soap bar.

Preferably, the method of making a soap bar of the present invention comprises: providing a soap (preferably, wherein the soap is provided as soap noodles; more preferably, wherein the soap is provided as soap noodles comprising an aqueous mixture of at least 70 wt % of total fatty material (TFM) and 10 to 15 wt % water); providing a psyllium; providing a cellulose derivative selected from the group consisting of a hydroxyalkyl alkyl cellulose (preferable, wherein the hydroxyalkyl alkyl cellulose is hydroxyethyl methyl cellulose); providing a sodium silicate; providing water; mixing the soap, the psyllium, the hydroxyalkyl alkyl cellulose, the sodium silicate and the water to form a combination (preferably, heating the soap, the psyllium, the hydroxyalkyl alkyl cellulose, the sodium silicate and the water while mixing to form the combination); milling the combination; extruding the milled combination; and stamping the extruded material to provide the soap bar. More preferably, the method of making a soap bar of the present invention, comprises: providing a soap (preferably, wherein the soap is provided as soap noodles; more preferably, wherein the soap is provided as soap noodles comprising an aqueous mixture of at least 70 wt % of total fatty material (TFM) and 10 to 15 wt % water); providing a psyllium; providing a cellulose derivative selected from the group consisting of a hydroxyalkyl alkyl cellulose (preferable, wherein the hydroxyalkyl alkyl cellulose is hydroxyethyl methyl cellulose); providing a sodium silicate; providing water; providing a fragrance and providing a processing aid; wherein the soap, the psyllium, the hydroxyalkyl alkyl cellulose, the sodium silicate, the fragrance; the processing aid and the water are mixed to form the combination (preferably, heating the soap, the psyllium, the hydroxyalkyl alkyl cellulose, the sodium silicate, the fragrance, the processing aid and the water while mixing to form the combination); milling the combination; extruding the milled combination; and stamping the extruded material to provide the soap bar.

Some embodiments of the present invention will now be described in detail in the following Examples.

Comparative Examples C1-C2 and Examples 1-10: Soap Bars

Soap bars were prepared having the composition noted in TABLE 1 for each of Comparative Examples C1-C2 and Examples 1-10. Soap noodles were crushed in sigma mixer and mixed along with the other ingredients in the amounts noted in TABLE 1 in the sigma mixer. All ingredients were added sequentially with no specific order, except for the perfume, which was added last. The entire mass was then transferred from the sigma mixer to a triple roll mill to triturate the mixture. All the processes were carried out under ambient conditions in the laboratory. The mass received from roll mill was then plodded in a screw plodder and extruded at a temperature of 45 to 65° C. The extruded mass was then cut into small pieces and punched in a soap die to provide the final product soap bars.

TABLE 1

| | Examples (wt %) | | | | | | | | | | | |
|---|---|---|---|---|---|---|---|---|---|---|---|---|
| Component | C1 | C2 | 1 | 2 | 3 | 4 | 5 | 6 | 7 | 8 | 9 | 10 |
| Soap Noodles[1] | 85.25 | 69.25 | 69.25 | 69.25 | 68.25 | 69.75 | 70.25 | 70.25 | 69.25 | 70.75 | 71.25 | 71.25 |
| Aq. sodium silicate (50 wt %) | 8.00 | 8.00 | 8.00 | 8.00 | 8.00 | 8.00 | 8.00 | 8.00 | 8.00 | 8.00 | 8.00 | 8.00 |
| $TiO_2$ | 0.75 | 0.75 | 0.75 | 0.75 | 0.75 | 0.75 | 0.75 | 0.75 | 0.75 | 0.75 | 0.75 | 0.75 |
| Fragrance[2]/Dyes | 1.00 | 1.00 | 1.00 | 1.00 | 1.00 | 1.00 | 1.00 | 1.00 | 1.00 | 1.00 | 1.00 | 1.00 |
| Psyllium[3] | 0 | 4.00 | 0 | 2.00 | 3.00 | 2.00 | 2.00 | 2.00 | 1.00 | 2.00 | 0.50 | 0.50 |
| Hydroxyethylmethylcellulose[4] | 0 | 0 | 4.00 | 2.00 | 2.00 | 1.50 | 1.00 | 0.50 | 3.00 | 0 | 0.50 | 0 |
| Hydroxyethylmethylcellulose[5] | 0 | 0 | 0 | 0 | 0 | 0 | 0 | 0 | 0 | 0.50 | 0 | 0.50 |
| Additional water | 7.50 | 21.00 | 22.00 | 21.50 | 21.50 | 21.00 | 21.00 | 21.00 | 21.00 | 21.00 | 22.00 | 22.00 |
| Bar Stamping/Processing* | S | U | S | S | S | S | S | S | S | S | S | S |
| Water content in product soap bar | 19.67 | — | 26.42 | 29.48 | 29.34 | 27.13 | 30.23 | 30.05 | 28.20 | 27.10 | 29.68 | 31.16 |

*S—Successful; U—Unsuccessful
[1]Wilfarin SN-8020 soap noodles available from Adani Wilmer Limited
[2]Ocean Beauty available from Aarav Fragrance
[3]Psyllium available from Giriraj Enterprise
[4]Walocel MW 60000 PFV available from The Dow Chemical Company
[5]Walocel MKX 60000 PF01 available from The Dow Chemical Company

Soap Bar Wear Rate

A trained panelist evaluated each of the soap bars prepared according to Comparative Example C1 and Examples 1-10 to assess the wear rate as the percent weight loss from the soap bar after 4 days of use using the following test protocol. Take poplin cotton fabrics of 20 cm×15 cm immersed in water. Weigh the soap bars initially (each soap bar composition is tested in triplicate). Scrub the bars 10 times with the top surface of the bar on the fabric surface. Each scrub is one horizontal stroke. Then scrub the bars 10 times with the bottom surface onto a different fabric kept under the same conditions using similar method. In total there will be 20 scrubs per soap bar. Set the soap bar aside for thirty minutes and then repeat the procedure. The process is repeated five times per day for each soap bar (i.e., 100 scrubs per soap bar per day). The soap bars are then maintained in a petri dish, in a tray with some water, covered with a paraffin film for overnight just to create a humidity. The next day the process is repeated (i.e., 100 scrubs per soap bar) and then the soap bars are stored as noted. This is continued for four consecutive days. On the fifth day the soap bars are weighed with the average wear rate reported in TABLE 2.

TABLE 2

| Ex | Wear Rate (wt %) |
|---|---|
| C1 | 9.12 |
| 1 | 0.11 |
| 2 | 6.13 |
| 3 | 4.55 |
| 4 | 3.49 |
| 5 | 6.67 |
| 6 | 6.86 |
| 7 | 1.04 |
| 8 | 6.36 |
| 9 | 7.95 |
| 10 | 7.78 |

We claim:

1. A soap bar, comprising:

35 to <75 wt %, based on weight of the soap bar, of a soap;

>23 to 40 wt %, based on weight of the soap bar, of water;

0.01 to 5 wt %, based on weight of the soap bar, of a cellulose derivative selected from the group consisting of a hydroxyalkyl alkyl cellulose; and an additive is a mixture of 0.1 to 5 wt %, based on weight of the soap bar, of a psyllium; and 2 to 18 wt %, based on weight of the soap bar, of a sodium silicate;

wherein the soap bar is a solid.

2. The soap bar of claim 1, wherein the cellulose derivative is selected from the group consisting of a hydroxyethyl methyl cellulose, a hydroxypropyl methyl celluose, hydroxyethyl cellulose and a mixture thereof.

3. The soap bar of claim 2, further comprising 0.01 to 3 wt %, based on weight of the soap bar, of a processing aid.

4. The soap bar of claim 3, further comprising 0.01 to 3 wt %, based on weight of the soap bar, of an optional component selected from the group consisting of at least one of a fragrance and a dye.

5. The soap bar of claim 4, further comprising a filler; and wherein the soap bar is a laundry soap bar.

6. The soap bar of claim 4, further comprising 0.1 to 5 wt %, based on weight of the soap bar, of a humectant; and wherein the soap bar is a personal cleansing soap bar.

7. The soap bar of claim 6, further comprising 0.01 to 0.5 wt %, based on weight of the soap bar, of a chelating agent.

8. A method of making a soap bar, comprising:
providing a soap;
providing a psyllium;
providing a cellulose derivative selected from the group consisting of a hydroxyalkyl alkyl cellulose;
providing a sodium silicate;
providing water;
mixing the soap, the psyllium, the hydroxyalkyl alkyl cellulose, the sodium silicate and the water to form a combination;
milling the combination;
extruding the milled combination; and
stamping the extruded material to provide the soap bar.

9. The method of claim 8, further comprising:
providing a fragrance; and
providing a processing aid;
wherein the fragrance and the processing aid are mixed along with the soap, the psyllium, the hydroxyalkyl alkyl cellulose, the sodium silicate and the water to form the combination.

* * * * *